Figure 5:
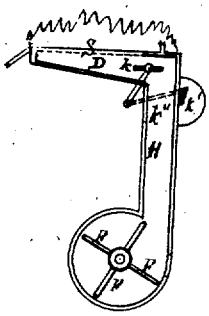

SS Reference

BEST AVAILABLE COPY

T. J. CHUBB.

Improvement in Separating Ores.

No. 5,033.

Reissued Aug. 20, 1872.

Witnesses:

J. Mat Wagner

F. C. Latting

Inventor:

Thos. J. Chubb

BEST AVAILABLE COPY

UNITED STATES PATENT OFFICE

THOMAS J. CHUBB, OF WILLIAMSBURG, NEW YORK.

IMPROVEMENT IN SEPARATING ORES.

Specification forming part of Letters Patent No. 18,038, dated August 25, 1857; extended seven years; reissue No. 5,033, dated August 20, 1872.

SPECIFICATION.

*To all whom it may concern:*

Be it known that I, THOMAS J. CHUBB, of Williamsburg, Kings county, New York, have discovered and invented new and useful Improvements in the Process of and Apparatus for Separating Ore and other substances of different specific gravity; and that the following is a full description thereof, reference being had to the accompanying drawing.

The nature of my improvement consists in the application of air peculiarly applied in puffs, jets, or an irregular current up through a perforated table or bed, or its equivalent, and through a layer of ore resting thereon, for the purpose of raising the ore off the table or bed at each upward puff, allowing it to subside again on the bed at each subsiding of the blast or puff of air. The air thereby slightly agitates the different substances contained in the ore, floating the lightest to the top of the layer and causing or allowing the heaviest (or those substances of the greatest specific gravity) to subside to the bottom of the layer on the said bed, or in regular stratified layers, one below the other, according to their greater density or the specific gravity of the different substances contained in the ore or material being dressed. The ore thus prepared in layers on the table or bed is ready to be removed off the bed by some other device, such as scrapers or strips of metal, so moved or arranged as to operate in guiding or moving the upper and lower stratums or layers in different directions toward opposite ends or sides of the machine, or by inclining the bed of the machine or the material thereon in such a manner as to cause a movement of the material on and across the bed, and drawing off or discharging the several layers at different heights, or above and below; or any equivalent manner of separating and discharging the layers (which are each composed of substances of different specific gravity) in separate receptacles, thus separating them from one another and causing them to leave the machine by separate channels or gates into separate receptacles.

The accompanying drawing represents a machine that embraces and employs the principles of the invention, and, although the machine is susceptible of considerable modifications, yet a full description of the example represented with reference to the drawing and some brief explanations of certain changes that may be made in the construction will serve to illustrate all the features of the invention and the method of employing the same.

Figure 1:
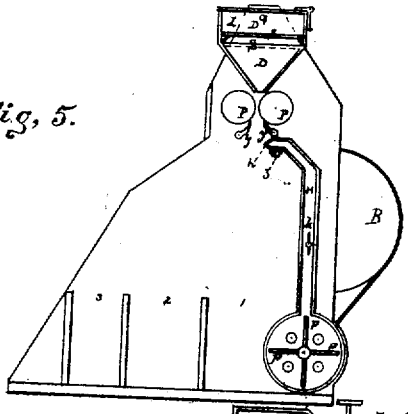
Figure 3:
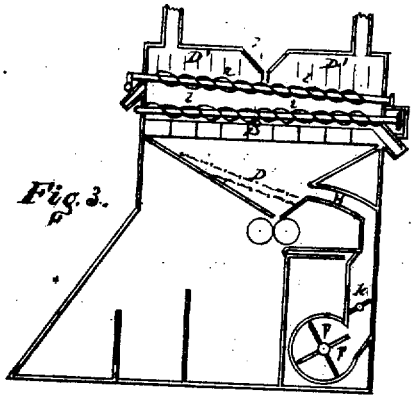
Figure 2:
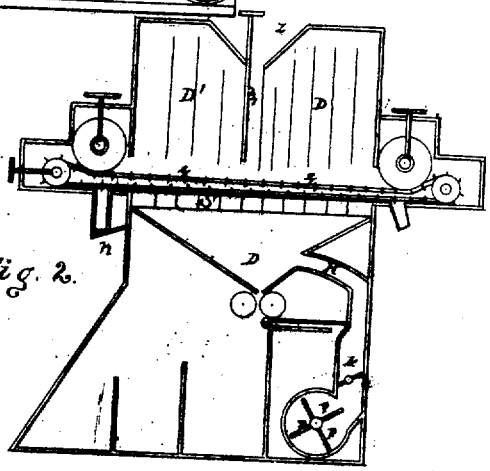
Figure 4:
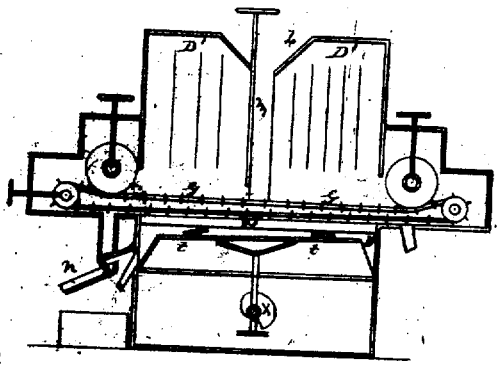

Figure 1 is a perspective view of a machine operated in the old way with my valve attached. Figs. 2, 3, 4 are sectional side elevations of machines constructed for employing my improved method of puffs of air applied up through the wire-cloth table or bed S. *k*, shown in Figs. 2 and 3, is a valve in the air-passage, to be operated by quarter turns, or turned by or on its shaft one-quarter of a circle at a time, thus producing an irregular current of air from a steady current leaving the fan-blower F F. *t*, Fig. 4, is a bellows-board or diaphragm-plate, intended to be operated up and down by a cam or its equivalent, thus producing puffs of air to be applied up through the bed and the material thereon. *l g l g* are strips of metal, attached to an endless belt or chain, for moving the material on and off the bed S, and may be arranged so as to guide the material to opposite ends or sides of the machine. S is the perforated bed.

Fig. 5 shows another view of the valve *k*, (and the crank and lever for operating the same,) arranged at the top of the air-chamber and passage H, and directly under and near the end of the perforated bed S, showing also the air-chamber D. Each revolution of the crank *k'*, acting upon the lever *k''*, produces a motion to the lever *k''* that opens and closes the valve *k* twice, and should be operated so as to have three hundred to five hundred revolutions per minute, giving six to ten hundred puffs per minute, varied in accordance with the size of the grains or crystals of the material being separated, and a less speed will operate to advantage on very coarse grains. The substances to be separated, when not in the form of grains, should be crushed; and the operation will be more perfect if the material be sorted into nearly-uniform sizes before being introduced into the machine.

The operation of the machine is as follows: The bed S, by and through the hopper on top, is continuously supplied with material to be separated. The agitation produced by the puffs of air has a tendency to keep the layers on the bed even, and also to float the lightest

BEST AVAILABLE COPY substances to the top of the layer while the heaviest are settling to the bottom. The scrapers remove the separated layers from off the bed at opposite sides or ends of the machine; or, if the bed be inclined, then the material thereon will be induced to flow down the incline by the action of the agitation produced by the puffs of air and gravitation, so that the heaviest particles will flow off at one end and the lightest particles scraped off at the other end; or in other ways shown and more fully illustrated in my patents No. 12,090, dated December 19, 1854; No. 18,085, dated September 1, 1857; No. 18,318, dated October 13, 1857; and other devices may be arranged to remove or discharge the several stratified layers of substances of different specific gravity into separate receptacles, all employing the within-described process and improvements—namely, the employment of puff or an intermittent current of air up through a perforated bed, and through the material thereon, for the purpose of separating the material into stratums or layers, each having a different specific gravity, independent of and regardless of the means or the mechanically-arranged devices for removing or discharging the said layers from off the bed. Care should be taken not to choke the machine. Gates may be arranged to govern the inflow and outgo of the material. The finer the size of the ore the thinner should be the layer—say, for the finest-sized granule, a layer of half an inch thick will work well—and the layer should be increased in thickness as the size of the grains increases, and the greater the pressure or force of the puff of air will also be required—to be increased with the thickness of the layer.

I should remark that this operation differs from the operation of screening or winnowing, as the air is applied in puffs, jets, or an irregular current solely for the purpose of separating the material into layers or stratums of different specific gravity on the bed, that they may be moved on or off the bed by other devices.

I do not confine my improvements to any specific arrangements of mechanism.

What I claim is—

1. Effecting or assisting to effect the separation or concentration of substances of different specific gravity by means of puffs, jets, or an intermittent current of air.

2. The arrangement of a bellows or diaphragm plate for producing puffs, jets, or an irregular current of air, in combination with a perforated ore bed or beds, for the purpose set forth.

3. The arrangement of a valve or valves in the air passage or chamber between the ore-bed and the blower, or other means of producing a current or pressure of air, and in combination with such bed or beds and device for compressing and forcing the air, for the purpose set forth.

4. Constructing machines with a valve or valves and valve-chamber arranged in the air passage or chamber connecting with the ore-bed, and a blower or device for supplying a current or pressure of air, for the purpose of converting said current into an irregular current, jets, or puffs of air, to be employed for the purpose set forth.

5. Constructing machines with a bellows or its equivalent—a diaphragm-plate—beneath or in connection with an ore-bed, for the purpose of producing an irregular current, jets, or puffs of air, to be forced up through said bed and the material resting thereon, to be employed for the purpose set forth.

6. The ore-bed S, the hopper, the valve *k*, the valve *m*, the air chamber and passages H, D, and D′, and the blower F, arranged and employed for the purpose set forth.

THOS. J. CHUBB.

Witnesses:
EDM. F. BROWN,
J. C. LATHROP.